Patented Nov. 5, 1929

1,734,798

UNITED STATES PATENT OFFICE

HARLEY B. DUTTON, OF FRANKLIN TOWNSHIP, SOMMERSET COUNTY, NEW JERSEY

COMPOSITION FOR APPLICATION TO TRACTIVE SURFACES

No Drawing.  Application filed March 4, 1927.  Serial No. 172,923.

The present invention relates to a composition of matter of the friction surface type, adapted in some cases for use as a belt dressing, and also adapted in some cases as a dressing for friction bands on automobile brakes, clutches and the like. The object of the invention is to produce a composition suitable for the above purposes, which will be highly effective in its operation, will be cheap to manufacture, and will last for a long time.

In its simplest form, the invention comprises a composition produced from two very cheap materials, namely old rubber and old engine oil. For producing better adhesion it is frequently advisable to add also another material namely evaporated asphalt paint. Together with the above ingredients there may be used oil of wintergreen or other oil having a powerful odor, for the purpose of masking the disagreeable odor of the other materials.

The old rubber, which may be old rubber extracted from automobile tire casings, old rubber hose or other fabricated articles containing rubber, or can be used in the form of old automobile inner tubes, is mixed with (say) an equal amount by weight of the oil, which is preferably old lubricating oil, say the oil from the crank cases of automobiles. The oil and rubber are mixed together, and are subjected to a heating process, in which the mixture is heated to a temperature of 600° F. for about 6 hours. The time and temperature can vary more or less, depending upon circumstances, and temperatures somewhat higher than that indicated can be employed, without detriment to the resulting product. During this operation a large part of the actual rubber in the rubber material treated is converted into a liquid condition, and certain impurities in the oil may settle out. At the end of this period, and after settling more or less, the liquid is strained off, preferably under some pressure, and the liquid part of the composition is allowed to cool for say 48 hours. To one part of the oil above referred to, there is then added about one part of the asphaltic product, this for example being asphalt paint which has first evaporated, to leave a solid or substantially solid body.

A small amount, say 20 drops to the gallon, of oil of wintergreen or other pleasant smelling oily material can then be added to the composition, and the composition in this form is an excellent belt dressing, since it not only possesses excellent tractive force, but also prevents the belts from becoming dry, stiff and hard, and accordingly prevents them from breaking, cracking and tearing, during use.

The entire liquid or the liquid without the asphalt added (i. e. oil and rubber alone) can be used for automobile brakes. This lubricates the brakes, increases the holding effect thereof, and keeps the same in a soft and pliable condition, whereby the life of the brake bands is considerably increased, and the holding power of the brake bands is also substantially increased.

I call attention to the fact that while I have stated that the three major substances are used preferably in about equal parts, these proportions have been found to give very satisfactory results, but the proportions can be varied more or less, without sacrificing the good effects of the invention.

When heating 100 lbs. of the rubber with 100 lbs. of oil, to 600° F., for 6 hours (with constant or occasional stirring) there may be a loss (by evaporation and decomposition taking place) of 25 lbs., more or less.

In place of the oil of wintergreen, any other substance to kill the unpleasant smell, can be employed, using the amount stated or other suitable amount for the purpose.

I claim:—

1. A tractive surface type composition, comprising old vulcanized rubber and old engine oil.

2. A composition of matter for tractive surfaces comprising old rubber, old engine oil, and dried asphalt paint.

3. A composition of matter for the purposes described, comprising old rubber and old oil in approximately equal amounts.

4. A composition of matter for the purposes described comprising old engine oil, old vulcanized rubber, and solid asphaltic material, in approximately equal amounts.

5. A process which comprises mixing old vulcanized scrap rubber with about an equal weight of old crank-case oil and heating the mixture to about 600° F. for about 6 hours, and stirring, at least occasionally during said time, whereby a large portion of the rubber scrap is converted into a liquid state.

In testimony whereof I have affixed my signature.

HARLEY B. DUTTON.